(12) United States Patent
Lore et al.

(10) Patent No.: US 8,529,199 B2
(45) Date of Patent: Sep. 10, 2013

(54) LOCKING DEVICE

(75) Inventors: Xavier Raymond Yves Lore, Beuzeville la Grenier (FR); Michel Christian Marie Jean, Montivilliers (FR)

(73) Assignee: Aircelle, Gonfreville l'Orcher (FR)

(*) Notice: Subject to any disclaimer, the term of this patent is extended or adjusted under 35 U.S.C. 154(b) by 837 days.

(21) Appl. No.: 12/673,716

(22) PCT Filed: Jun. 12, 2008

(86) PCT No.: PCT/FR2008/000810
§ 371 (c)(1),
(2), (4) Date: Feb. 16, 2010

(87) PCT Pub. No.: WO2009/027588
PCT Pub. Date: Mar. 5, 2009

(65) Prior Publication Data
US 2011/0103946 A1 May 5, 2011

(30) Foreign Application Priority Data
Aug. 20, 2007 (FR) ...................................... 07 05918

(51) Int. Cl.
*F01D 25/24* (2006.01)
(52) U.S. Cl.
USPC .................. 415/127; 415/220; 415/214.1
(58) Field of Classification Search
USPC ............... 244/129.4, 129.5; 292/95, 96, 100, 292/101, 116, 118, 120; 60/796, 798
See application file for complete search history.

(56) References Cited

U.S. PATENT DOCUMENTS

| 4,602,812 A | 7/1986 | Bourne |
| 6,325,428 B1 | 12/2001 | Do |
| 6,334,730 B1 * | 1/2002 | Porte ............................ 403/104 |
| 2008/0054123 A1 * | 3/2008 | French et al. .............. 244/129.5 |

FOREIGN PATENT DOCUMENTS

| DE | 102004063239 | 1/2006 |
| EP | 0096100 | 12/1983 |
| EP | 1336707 | 8/2003 |
| GB | 2288578 | 10/1995 |

OTHER PUBLICATIONS

International Search Report; PCT/FR2008/000810; Feb. 4, 2009.

* cited by examiner

*Primary Examiner* — Edward Look
*Assistant Examiner* — Maxime Adjagbe
(74) *Attorney, Agent, or Firm* — Brinks Hofer Gilson & Lione

(57) ABSTRACT

The invention relates to a locking device (13) that includes at least one locking system (16), intended to be placed on a first moving element (11), and a retaining member (17), intended to be placed on a second moving element (12), the locking system (16) having a first hook (18) designed to engage with the retaining member so as to lock the locking device (13). The locking system (16) includes at least a second hook (19) set back from the first hook (18) so as to engage with the retaining member in the event of the first hook (18) breaking.

13 Claims, 5 Drawing Sheets

LOCKING DEVICE

TECHNICAL FIELD

The invention relates to a locking device comprising at least one locking system, intended to be arranged on a first movable element, and a retaining member, intended to be arranged on a second movable element, the locking system comprising a first hook designed to come into engagement with the retaining member so as to effect the locking of the locking device.

BACKGROUND

A locking device of this type is used, in particular, in order to equip a nacelle, intended for equipping an aircraft.

An aircraft is driven by means of a plurality of turbojet engines, each accommodated in a nacelle which likewise houses an assembly of accessory actuating devices associated with its operation and ensuring various functions when the turbojet reactor is in operation or at a standstill. These accessory actuating devices comprise, in particular, a mechanical system for the actuation of thrust reversers.

A nacelle generally has a tubular structure comprising an air inlet upstream of the turbojet engine, a middle section intended for surrounding a blower of the turbojet engine, and a rear section capable of housing thrust reversal means and intended for surrounding the combustion chamber of the turbojet engine and generally terminates in an ejection nozzle, the outlet of which is located downstream of the turbojet engine.

Modern nacelles are often intended for housing a double-flow turbojet engine capable of generating, by means of the rotating blades of the blower, a stream of hot air (also called a primary stream), coming from the combustion chamber of the turbojet engine.

A nacelle generally has an external structure, called an outer fixed structure (OFS), which, with a concentric internal structure, called an inner fixed structure (IFS), defines an annular flow channel also called a flow section, intended for channeling a stream of cold air, called a secondary stream, which circulates outside the turbojet engine. The primary and secondary stream which are ejected from the turbojet engine at the rear of the nacelle.

Each propulsive assembly of the aircraft is thus formed by a nacelle and a turbojet engine and is suspended on a fixed structure of the aircraft, for example under a wing or on the fuselage, by means of a pylon or mast attached to the turbojet engine or to the nacelle.

The rear section of the external structure of the nacelle is normally formed from one first and one second half shell of substantially semi-cylindrical shape, on either side of a longitudinal plane of symmetry of the nacelle, and mounted movably so as to be capable of being deployed between an operating position and a maintenance position for the purpose of giving access to the turbojet engine. The two half shells are generally mounted pivotably about a longitudinal axis forming a hinge in the upper part (at 12 o'clock) of the reverser. The half shells are held in the closing position by means of locking devices arranged at least along a junction line located in the lower part (at 6 o'clock).

The rear section and the middle section are linked by means of a fixed frame. The front edge of the rear section is an especially sensitive zone since it has means for positioning each half shell with respect to the fixed frame. As is known per se, these positioning means are formed by an annular rib of V-shaped profile and by a groove of complementary shape and profile. When the half shells are in a position close to one another, each rib is engaged in the corresponding groove, so that each half shell is held in position during the flight of the aircraft.

In order to hold the half shells in position, a locking device is provided in the region of the front edge of these, at least in the lower junction zone.

During flight, the walls of the nacelle are subjected to high stresses contributable to the passage of air or gas under pressure, so that it is necessary to provide an additional locking device intended for supplementing the abovementioned locking device in the event of a fracture of the latter.

Other locking devices are provided in the region of the lower junction zone, at the rear of the front edge.

However, the front zone of the rear section makes it possible to accommodate the pipework equipping the turbojet engine. Thus, the locking device equipping the front edge is arranged at a distance from the other locking devices, and it is therefore necessary to provide another locking device in the region of the front edge.

Owing the bulk of the abovementioned pipework, it becomes very difficult to equip the front edge with a complete additional locking device.

BRIEF SUMMARY

The disclosure provides a compact locking device which satisfies safety requirements during flight.

To achieve this, the invention relates to a locking device of the abovementioned type, characterized in that the locking system comprises at least one second hook set back from the first hook so as to engage with the retaining member in the event of a fracture of the first hook.

Thus, only the first hook is subjected to stresses and to a fatigue phenomenon during the flight of the aircraft. In the event of a fracture of the first hook, the second hook makes it possible to perform the same function as the first. A single locking device thus makes it possible to implement both the conventional locking function and the safety function, thus increasing the compactness of the assembly.

Such a characteristic makes it possible, moreover, to under-size the second hook, called a safety hook, with respect to the first, so that the compactness of the locking device is further improved.

According to one characteristic of the invention, the second hook is set back from the first at a distance of between 0.5 and 1.5 mm, preferably of the order of 1 mm.

Advantageously, the locking system comprises actuating means designed for simultaneously actuating the first and the second hook.

This characteristic makes it possible to facilitate the actuation of the locking device, while at the same time limiting the risks of a handling error and also the overall size of the locking device.

According to one possibility of the invention, the locking system is equipped with means for setting the position of the first and/or of the second hook.

The setting means make it possible, in particular, to set the prestress in the region of the first hook. In a particular case, the setting of the position of the second hook with respect to the first makes it possible to subject both the first and the second hook to stress. In this case, however, it is necessary to ensure that the second hook undergoes stress to only a slight extent. The forces are then distributed to the two hooks, and it is therefore still possible to reduce the dimensioning of these.

Preferably, the locking system comprises two hooks.

The invention also relates to a turbojet engine nacelle intended for equipping an aircraft and comprising a front air inlet section, a middle section intended for surrounding a blower of the turbojet engine, and a rear section formed from at least one first and one second half shell which are mounted movably in rotation on an axis, so as to each be capable of being deployed between an operating position, in which the half shells are close to one another, and a maintenance position, in which the half shells are apart from one another, characterized in that said nacelle comprises at least one locking device according to the invention.

The invention relates, furthermore, to an aircraft, characterized in that it is equipped with at least one nacelle according to the invention.

BRIEF DESCRIPTION OF THE DRAWINGS

In any event, the invention will be understood clearly from the following description, with reference to the accompanying diagrammatic drawing illustrating an embodiment of this nacelle by way of example.

DETAILED DESCRIPTION

Figure 1:
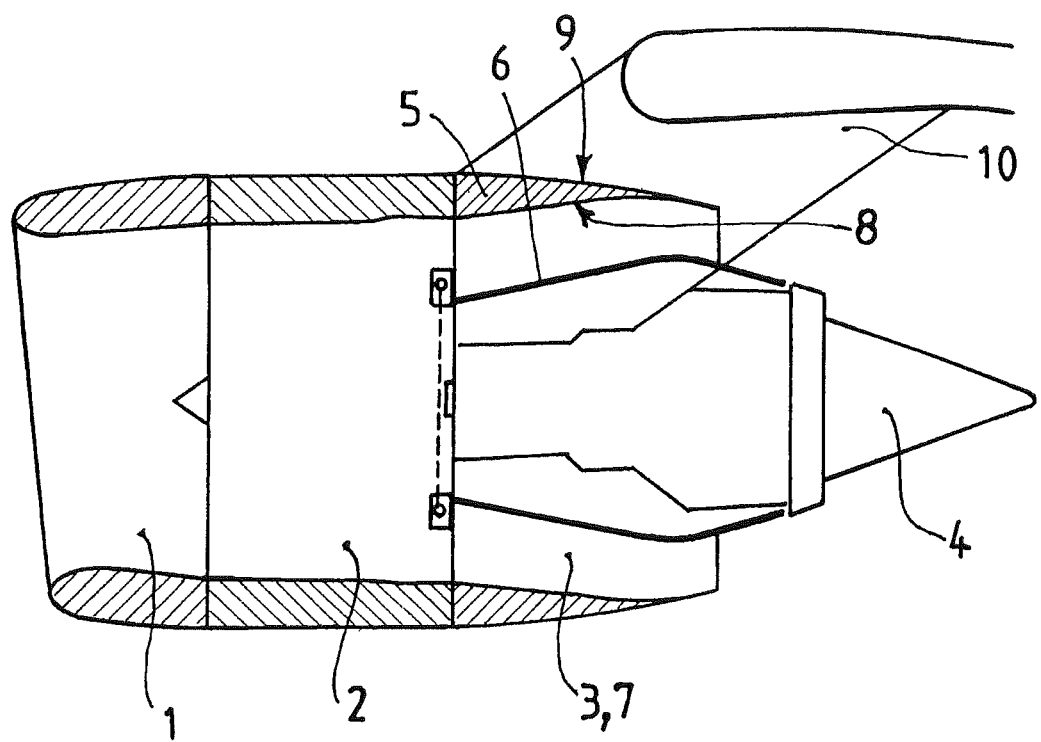
FIG. 1 is a diagrammatic view of a nacelle in longitudinal section.

FIG. 1 illustrates a nacelle according to the invention, intended for equipping an aircraft. This nacelle has a tubular structure comprising an air inlet 1 at the front of the turbojet engine, a middle section 2 intended for surrounding a blower of the turbojet engine, and a rear section 3 capable of housing thrust reversal means and intended for surrounding the combustion chamber of the turbojet engine, and terminates in an ejection nozzle 4, the outlet of which is located downstream of the turbojet engine.

The nacelle is intended for housing a double-flow turbojet engine capable of generating, by means of the rotating blades of the blower, a stream of hot air (also called a primary stream) coming from the combustion chamber of the turbojet engine.

The nacelle has an external structure 5, called an outer fixed structure (OFS), which, with a concentric internal structure 6, called an inner fixed structure (IFS), defines an annular flow channel 7, also called a flow section, intended for channeling a stream of cold air, called a secondary stream, which circulates outside the turbojet engine. The primary and secondary streams are ejected from the turbojet engine at the rear of the nacelle.

Figure 2:
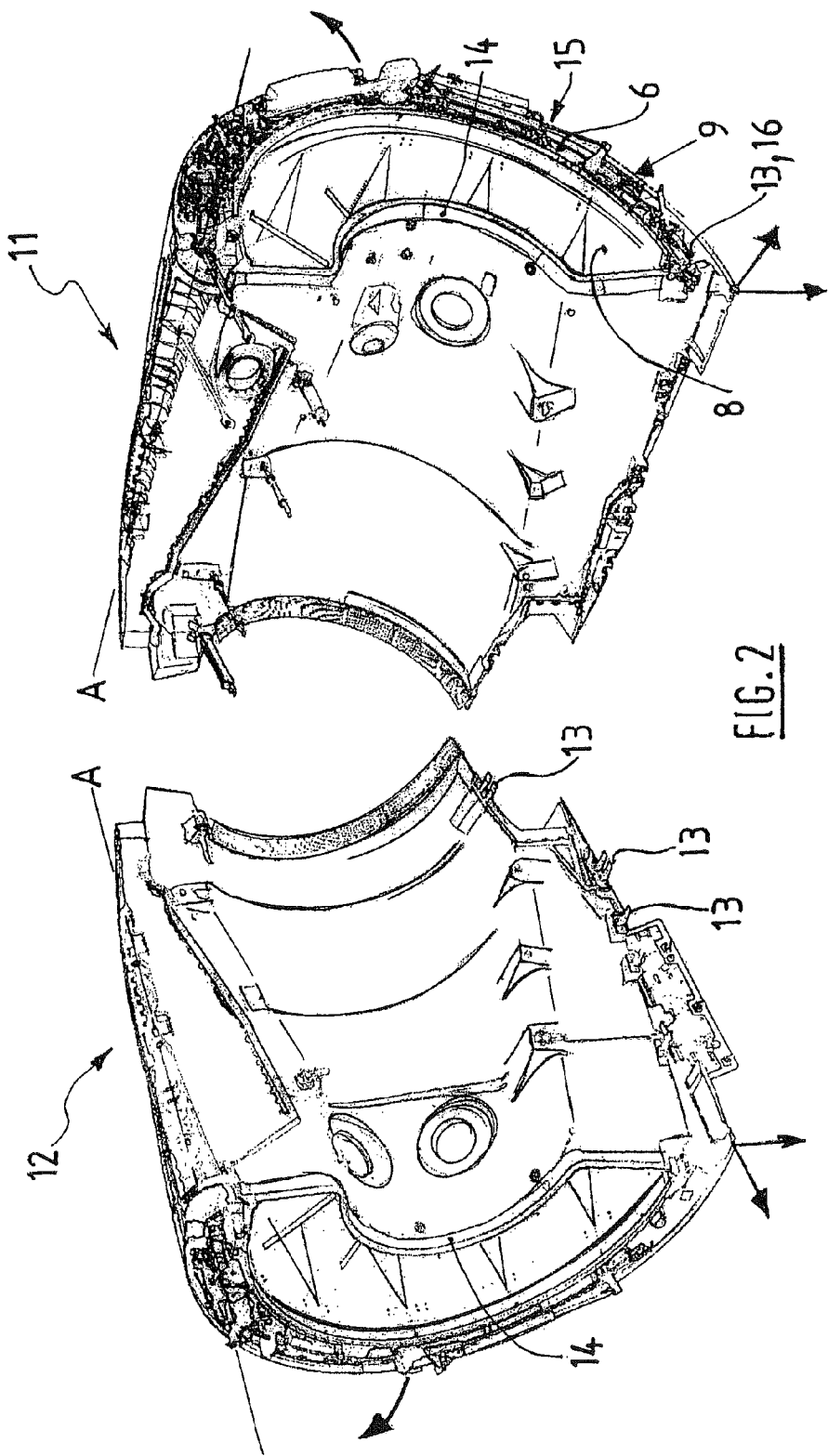
FIG. 2 is an exploded view of the rear section of the nacelle in perspective.

As becomes apparent more particularly from FIG. 2, the external structure 5 comprises an internal cowl 8 and an external cowl 9.

Each propulsive assembly of the aircraft is thus formed by a nacelle and a turbojet engine and is suspended on a fixed structure of the aircraft, for example under a wing or on the fuselage, by means of a pylon or mast 10 attached to the turbojet engine or to the nacelle.

As becomes apparent from FIG. 2, the rear section 5 of the external structure of the nacelle is formed from a first and a second half shell 11, 12 of substantially semi-cylindrical shape, on either side of the longitudinal vertical plane of symmetry of the nacelle, and mounted movably so as to be capable of being deployed between an operating position and a maintenance position for the purpose of giving access to the turbojet engine. The two half shells 11, 12 are each mounted pivotably about an axis A forming a hinge in the upper part (at 12 o'clock) of the reverser. The half shells are held in the closing position by means of locking devices 13 arranged at least along a junction line located in the lower part (at 6 o'clock).

The middle and rear sections 2, 3 are conventionally linked to one another by means of a fixed frame 14, the first and second half shells 11, 12 being equipped with positioning means which in the operating position cooperate with complementary positioning means formed in the region of the front edge of the half shells.

As is known per se, the positioning means comprise a beveled annular rib of general V-shaped profile, the complementary positioning means having a groove of complementary shape and profile.

The annular rib is arranged more particularly in the region of the front edge 15 of the internal cowl 8 of the external structure 5.

The nacelle is equipped with a locking device 13 comprising a locking system 16, arranged on the first half shell 11, and a retaining member 17, arranged on the second half shell 12.

Figure 4:
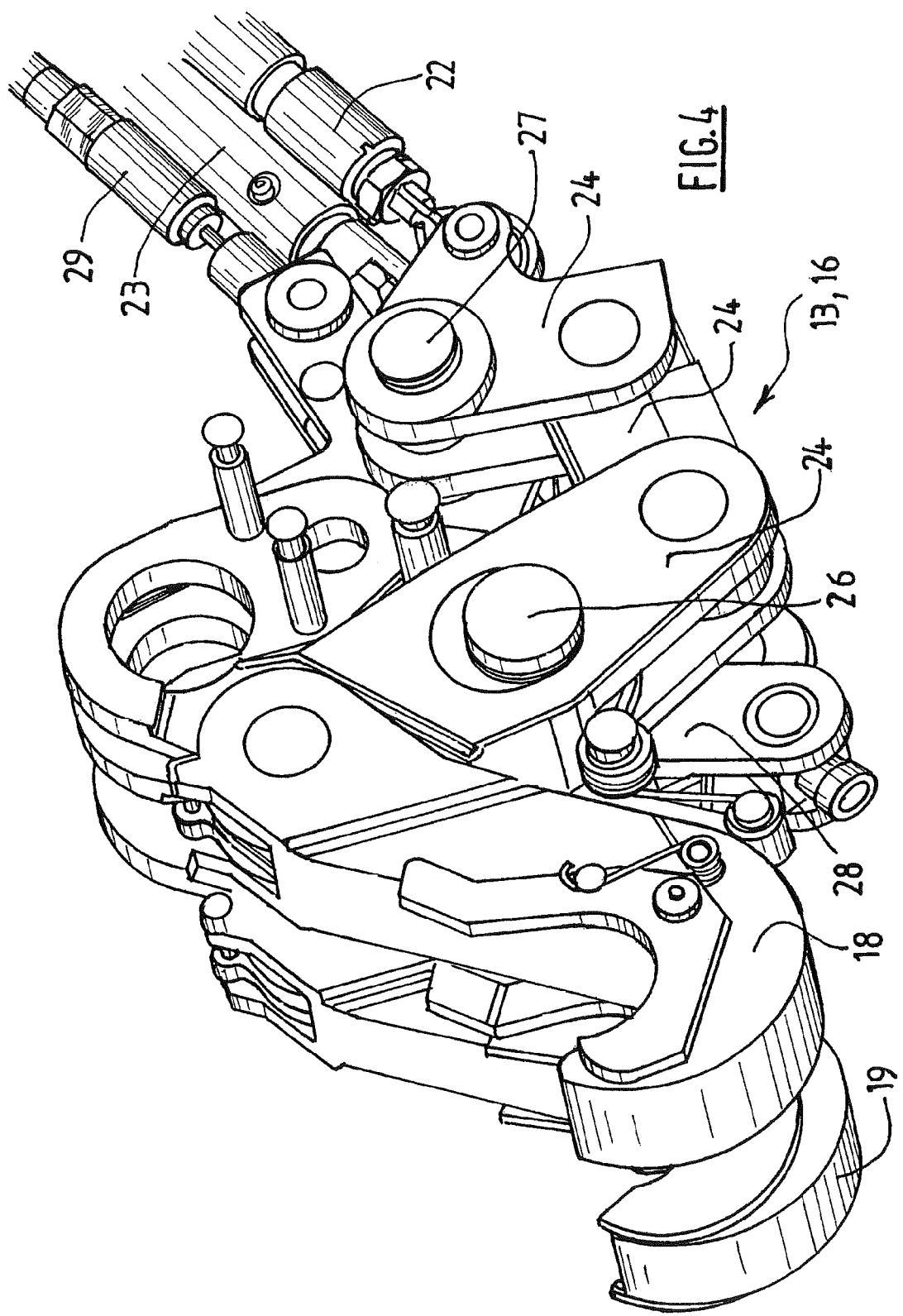
FIG. 4 is a perspective view of part of the latter.
Figure 5:
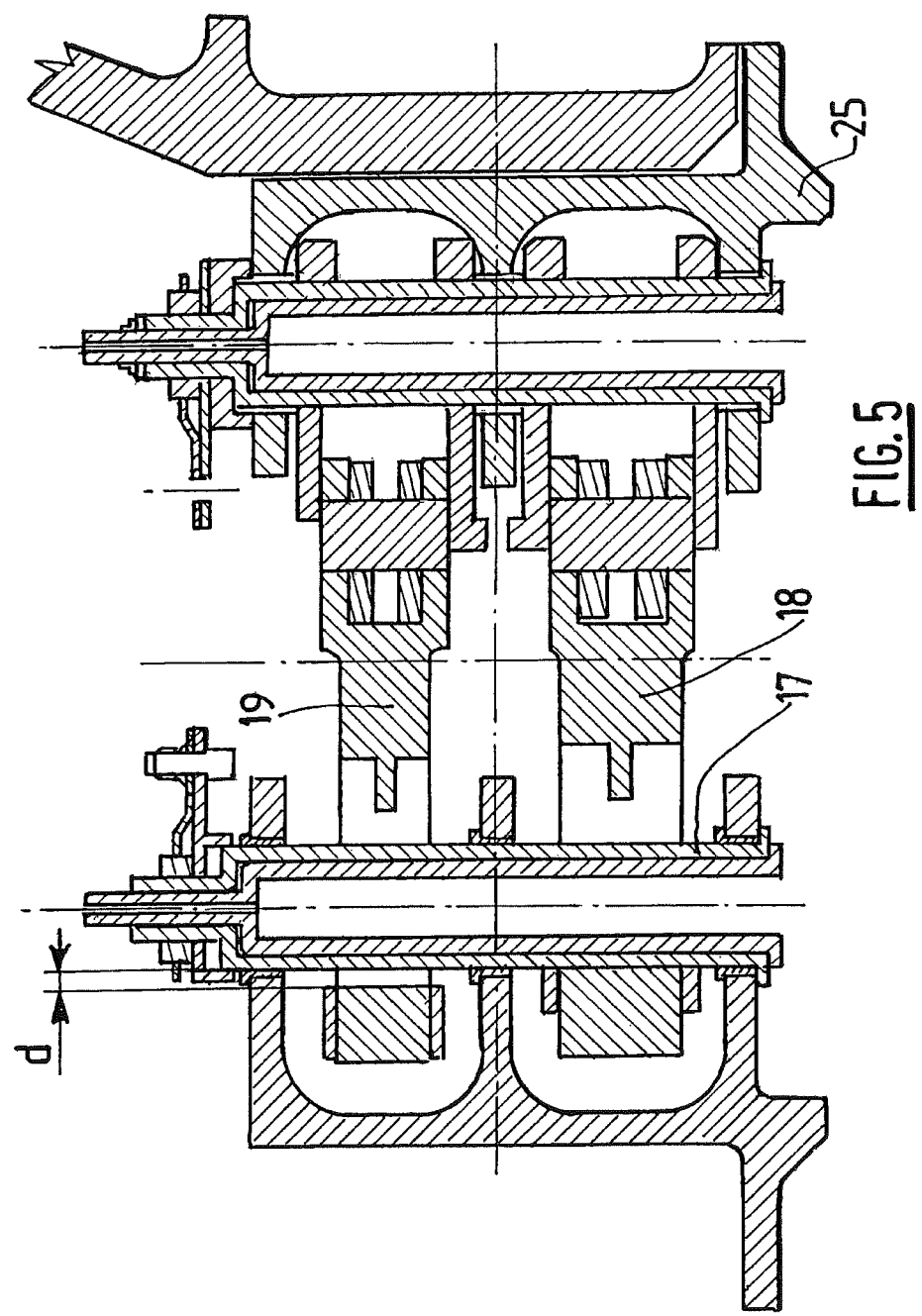
FIG. 5 is a sectional top view of the abovementioned part.

As illustrated in FIGS. 4 and 5, the locking system 16 comprises a first hook 18, designed to come into engagement with the retaining member 17 so as to effect the locking of the locking device, and a second hook 19 set back from the first hook 18 so as to engage with the retaining member 17 in the event of a fracture of the first hook 18.

The offset d between the two hooks 18, 19 is illustrated more particularly in FIG. 5, in which the locking device 13 is illustrated in the locked position. This offset d is between 0.5 and 1.5 mm, preferably of the order of 1 mm. As is likewise illustrated in this figure, the second hook 19 may be undersized with respect to the first 18.

Figure 3:
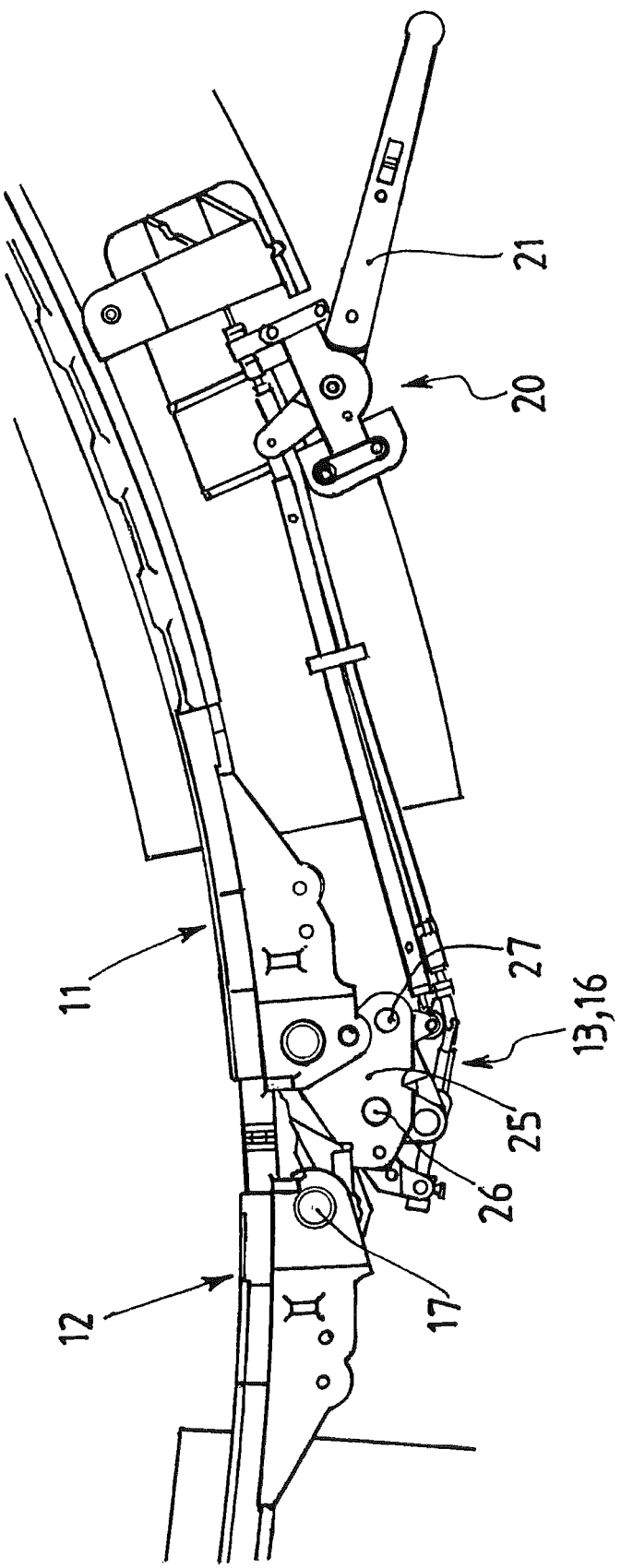
FIG. 3 is a front view of the locking device according to the invention.

As illustrated in FIG. 3, the locking system 16 comprises actuating means 20 designed for simultaneously actuating the first and the second hook.

These actuating means 20 have a handle 21 accessible to an operator from the external cowl 9 of a nacelle, the handle 21 being linked to two control rods 22, 23, themselves each linked to a set of rockers 24. Each set of rockers 24 is linked to one of the hooks 18, 19, the rockers 24 being mounted in an articulated manner on a yoke 25 secured to the first half shell 11 by means of fixed shafts 26, 27.

The displacement of the handle 21 brings about the actuation of each hook 18, 19.

The locking system 16 is equipped, moreover, with means for setting the position of the first and of the second hook. The setting means comprise a stop-forming element 28, the position of which can be adjusted by means of a setting cable 29. These setting means make it possible, in particular, to set the position of the second hook 19 with respect to the first 18.

In a particular case, the position of the hooks 18, 19 can be adjusted so that, in the locked position of the locking device 13, a major part of the locking force is supported by the first hook 18, a minor part of this force being supported by the second hook 19.

It will be appreciated that the invention is not limited only to that embodiment of this turbojet engine nacelle which is described above by way of example, but, on the contrary, embraces all variants.

The invention claimed is:
1. A turbojet engine nacelle intended for equipping an aircraft, the nacelle comprising:
   a front air inlet section;
   a middle section intended for surrounding a blower of the turbojet engine;

a rear section formed from at least one first and one second half shell which are mounted movably in rotation on an axis, so as to each be capable of being deployed between an operating position, in which the half shells are close to one another, and a maintenance position, in which the half shells are apart from one another; and at least one locking device comprising at least one locking system, intended to be arranged on a first movable element, and a retaining member, intended to be arranged on a second movable element, the locking system comprising a first hook designed to engage with the retaining member and to support a major part of a locking force, wherein the locking system comprises at least one second hook set back from the first hook so as come into engagement with the retaining member in the event of a fracture of the first hook.

2. The nacelle as claimed in claim 1, wherein the second hook is set back from the first at a distance of between 0.5 and 1.5 mm.

3. The nacelle as claimed in claim 1, wherein the locking system comprises actuating means designed for simultaneously actuating the first and the second hook.

4. The nacelle as claimed in claim 1, wherein the locking system is equipped with means for setting the position of the first and/or of the second hook.

5. The nacelle as claimed in claim 1, wherein the locking system comprises two hooks.

6. An aircraft, comprising at least one nacelle as claimed in claim 1.

7. The nacelle as claimed in claim 2, wherein the second hook is set back from the first at a distance of about 1 mm.

8. The nacelle as claimed in claim 2, wherein the locking system comprises actuating means designed for simultaneously actuating the first and the second hook.

9. The nacelle as claimed in claim 2, wherein the locking system is equipped with means for setting the position of the first and/or of the second hook.

10. The nacelle as claimed in claim 3, wherein the locking system is equipped with means for setting the position of the first and/or of the second hook.

11. The nacelle as claimed in claim 2, wherein the locking system comprises two hooks.

12. The nacelle as claimed in claim 3, wherein the locking system comprises two hooks.

13. The nacelle as claimed in claim 4, wherein the locking system comprises two hooks.

* * * * *